United States Patent [19]

Johnson

[11] 4,411,962
[45] Oct. 25, 1983

[54] INDUCED OR CONSTRAINED SUPERPLASTIC LAMINATES FOR FORMING

[75] Inventor: Robert M. Johnson, Arlington, Tex.

[73] Assignee: Vought Corporation, Dallas, Tex.

[21] Appl. No.: 328,742

[22] Filed: Dec. 8, 1981

[51] Int. Cl.³ .......................................... B32B 15/01
[52] U.S. Cl. .............................. 428/615; 148/11.5 R; 428/11.5 Q; 428/650; 428/652; 428/658; 428/659; 428/668; 428/684
[58] Field of Search ............... 428/615, 650, 652, 658, 428/659, 668, 684; 148/11.5 R, 12 R, 11.5 Q

[56] References Cited

U.S. PATENT DOCUMENTS

| 3,339,271 | 9/1967 | Durfee et al. | 427/383.7 |
| 3,340,101 | 9/1967 | Fields, Jr. et al. | 148/11.5 R |
| 3,434,319 | 3/1969 | Logerot | 72/47 |
| 3,793,700 | 2/1974 | Maikish et al. | 29/419 |
| 3,873,458 | 3/1975 | Parkinson | 252/49.5 |
| 3,934,441 | 1/1976 | Hamilton et al. | 72/60 |
| 3,951,697 | 4/1976 | Sherby et al. | 148/12 R |

OTHER PUBLICATIONS

Backofen, W. A.; *Deformation Processing*; pp. 217-220; Addison-Wesley, 1972.
Wadsworth, J. et al.; "Fine Structure and Superplasticity in Ultrahigh Carbon Steels"; 1977.
Oyama, T. et al.; Influence of Dilute Alloying Additions on the Superplastic Properties of Ultrahigh Carbon Steels; 1979.

Primary Examiner—W. Stallard
Attorney, Agent, or Firm—Charles S. Cotropia; Steven S. Sadacca; James M. Cate

[57] ABSTRACT

A metal laminate possessing high strength characteristics as well as good ductility and malleability, comprising one or more layers of a superplastic material metallurgically bonded to one or more layers of a non-superplastic material; and the method of preparing the laminate to induce plastic or super plastic characteristics to the nonsuper plastic material.

24 Claims, 12 Drawing Figures

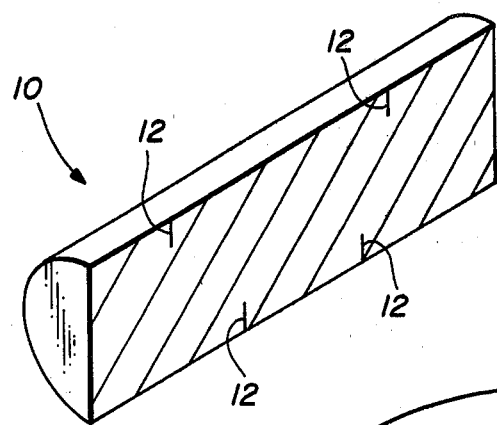
FIG. IA
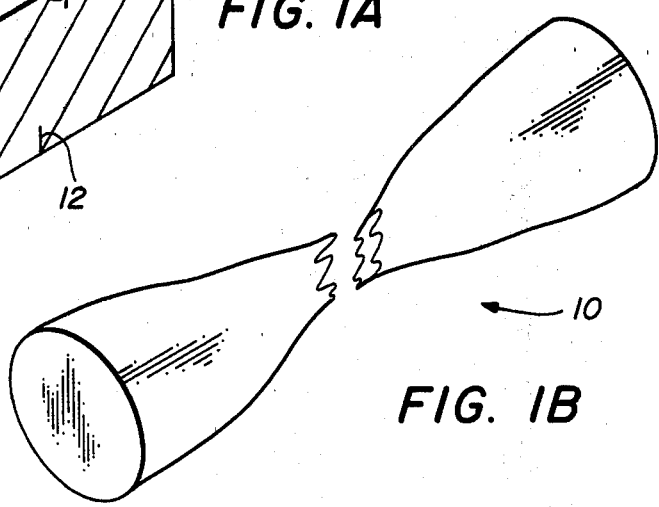
FIG. IB
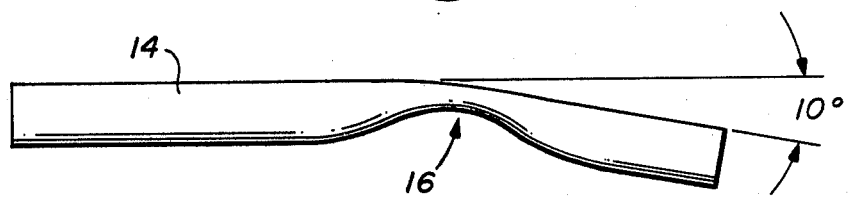
FIG. IC
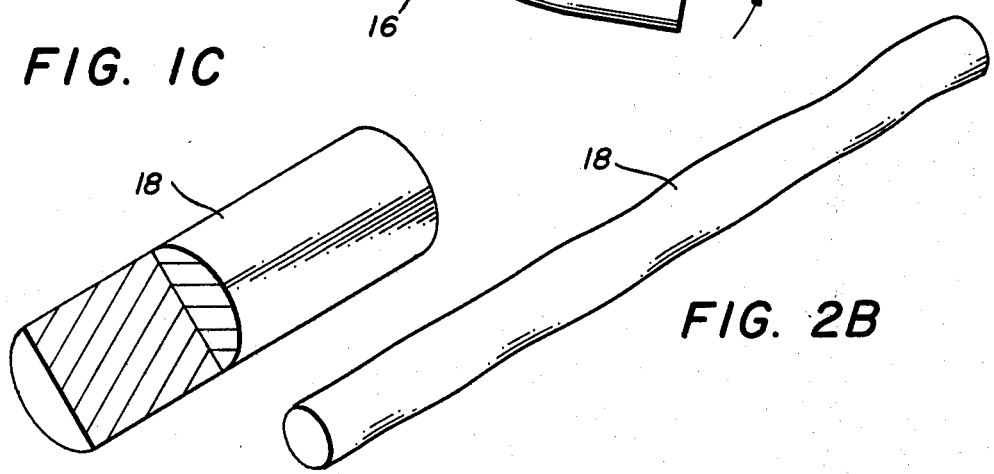
FIG. 2A
FIG. 2B
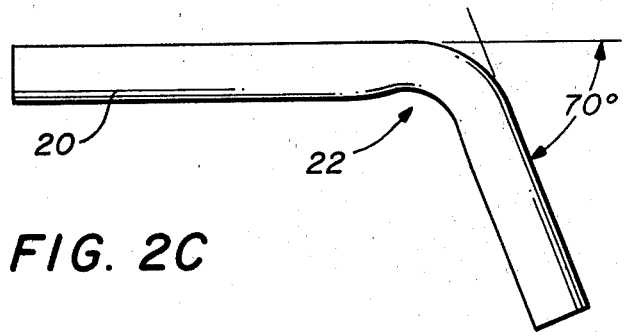
FIG. 2C

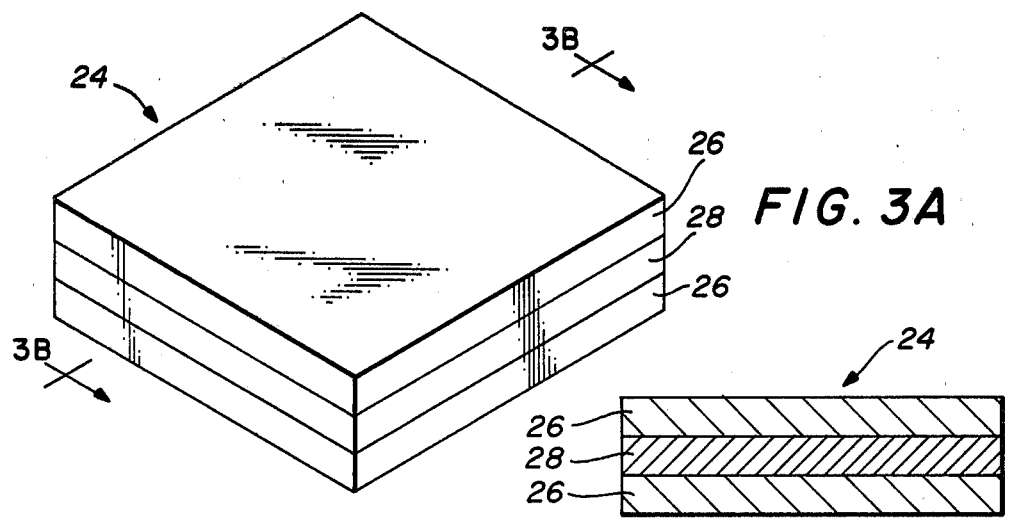
FIG. 3A
FIG. 3B
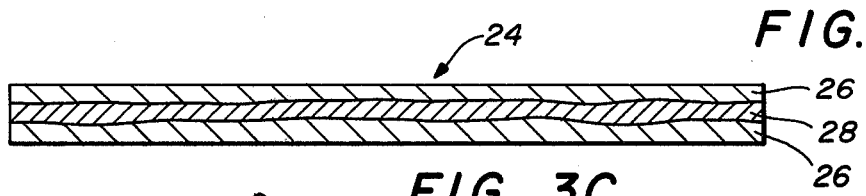
FIG. 3C
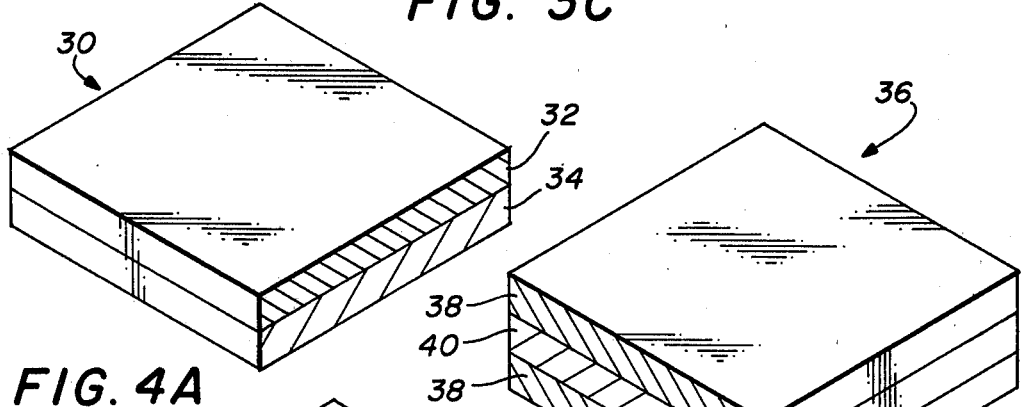
FIG. 4A
FIG. 4B
FIG. 4C

INDUCED OR CONSTRAINED SUPERPLASTIC LAMINATES FOR FORMING

TECHNICAL FIELD

This invention relates to metals and metal forming. More particularly, this invention relates to a metal laminate comprising one or more layers of a superplastic metal bonded to one or more layers of a non-superplastic material, and the method of preparing such a laminate to induce improved plastic or superplastic characteristics into the non-superplastic material by constraining the tendency of the non-superplastic material to neck down locally by the bonding to a superplastic material.

BACKGROUND OF THE INVENTION

Engineering materials, particularly metals or metal alloys, exhibit widely varying properties based on the composition of the metal, the processing of the metal, and the method used in forming an article from the metal. The term "metal" as used herein will be used generally to mean metals and their alloys, unless otherwise indicated. Products made from metals are generally produced by casting or by forming. In general, forming is accomplished by the plastic working of a metal such as steel. Plastic working is the permanent deformation accomplished by applying mechanical forces to a metal. The primary objective of such working is usually the production of a specific shape or size, but may in some cases be done to achieve improved physical or mechanical properties. Plastic deformation of metals normally is accomplished by one of two methods: hot working and cold working. In hot working, the metal is heated to the proper temperature which is above the recrystallization temperature and then deformed. After deformation, the basic strength of the metal is essentially unchanged. Methods of hot working are hammering, pressing, rolling and extrusion. Hot working is generally performed for purposes of shaping.

Cold working is the deformation without heating or deformation done below the recrystallization temperature. Cold working may be used for the shaping of thin articles and is commonly used to achieve improved mechanical properties, better machinability, special size accuracy, and the production of thinner material than could be economically produced by hot working.

Engineering materials generally exhibit limited formability because of the plastic instability that occurs where hardening processes are inadequate to constrain localized inhomogeneous strains (necking) under developing tri-axial stresses. Many methods have been used to improve the formability of metals in efforts to increase resistance to necking, tearing or galling during forming processes. For example, U.S. Pat. No. 3,873,458 to Parkinson, discloses a lubricant coating containing a resin which is applied to metals during forming to lubricate the metal, allowing it to flow more uniformly during the forming process, thereby reducing the likelihood that it will tear or gall.

Many times scales or impurities on or near the surface of a metal will increase its necking characteristics thereby decreasing its workability. When certain metals such as alloys of titanium are heated during hot workings they react with the atmosphere increasing the amounts of contaminating impurities in those metals, thus limiting their workabilities. U.S. Pat. No. 3,339,271 to Durfee, et al. discloses a nickel plating for titanium alloys which serves to protect the alloy from reaction with the atmosphere during hot working, thereby improving its workability.

Certain metals exhibit the characteristic of superplasticity which permits those metals to be elongated from about 300 percent to about 1000 percent and allows complex forming processes to be accomplished with those metals. A method for superplastic forming was disclosed in U.S. Pat. No. 3,340,101 to Fields, Jr., et al. This patent discloses procedures for heating or otherwise conditioning a metal to produce the appropriate strain rate sensitivity followed by placement of the metal in an apparatus for forming. U.S. Pat. No. 3,934,441 to Hamilton, et al. discloses a method for the superplastic forming of titanium alloys in a controlled environment to prevent contamination of the alloy.

In general, high strength materials are brittle, i.e., having the tendency to fracture without appreciable deformation, and therefore exhibiting low ductility and malleability. Therefore, fabrication of complex high strength items requires expensive machining and fabrication techniques. Thus, although many high strength metals have been developed, numerous metallurgical and material processing problems exist which preclude their applications of those metals, to low cost, high strength structures such as the types desired for supersonic tactical missiles. Examples of such problems include forming and fastening, cracking at welds, susceptibility to hydrogen embrittlement, stress corrosion and cost effective heat treatments of the completed structural configurations. On the other hand, metals exhibiting ductility and malleability or which exhibit superplastic characteristics are generally of medium or low strength and while easily formed, do not possess the required strength for desired application. This is especially true in aeronautical applications where the strength to weight ratio is extremely important.

Thus, there has been a continuing need for a high strength material which may be formed providing production of economical and lightweight high strength structural configurations, especially in the aeronautical industry. The present invention provides a major advance in engineering materials. The present invention provides for a lamination of superplastic metals to non-superplastic high strength metals which produces a laminate that not only exhibits improved plastic or superplastic characteristics, but also high strength. This laminate may be formed by known superplastic forming methods to achieve a high strength formed structure.

SUMMARY OF THE INVENTION

In one aspect, the present invention relates to a metal laminate possessing high strength characteristics as well as good ductility and malleability. This is accomplished by the lamination of a superplastic metal to a non-superplastic metal such that the superplastic material constrains localized necking in the non-superplastic material, thereby inducing superplasticity to the non-superplastic material in the lamination. In another aspect, the present invention relates to a method for producing a laminate with improved plastic or superplastic characteristics.

In yet another aspect, the present invention relates to improving the plasticity of relatively non-plastic or of materials of minimal plasticity by bonding thereto a material having good plastic properties.

In accordance with the present invention, a metal laminate is provided which is characterized by high strength and highly plastic or superplastic characteristics. The laminate is preferably constructed from alloys of similar metals, at least one of which is a superplastic metal and at least one of which is a non-superplastic high strength metal. The laminate may be constructed from two or more layers of metal. The particular configuration of the superplastic and non-superplastic layers will be selected based on several factors such as described strength, corrosion resistance, the strength to weight ratio desired and the degree of plasticity desired.

In the preferred embodiment, the superplastic material is processed to assure that it will possess the desired superplastic characteristics. The superplastic material is metallurgically bonded to the non-superplastic material in any suitable manner such as diffusion bonding or roll bonding. The laminate thus obtained may be formed by superplastic forming techniques to produce more complex structures than could be derived from the non-superplastic metal alone.

BRIEF DESCRIPTION OF THE DRAWINGS

A more complete understanding of the invention and its advantages will be apparent from the Detailed Description taken in conjunction with the accompanying Drawings in which:

FIG. 1A is a cross-sectional perspective view of a layer of non-superplastic material prior to application of a tensile load;

FIG. 1B is a perspective view of the non-superplastic material of FIG. 1A after it has been stretched;

FIG. 1C is a side view of the non-superplastic material of FIG. 1 formed at a 10 degree angle;

FIG. 2A is a cross-sectional perspective view of a superplastic material;

FIG. 2B is a perspective view of the superplastic material of FIG. 2A after it has been stretched;

FIG. 2C is a side view of the material of FIG. 2A after it has been formed at a 70 degree angle;

FIG. 3A is a perspective view of a laminate of the present invention;

FIG. 3B is a cross-sectional view of FIG. 3A along line 3B—3B;

FIG. 3C is a cross-sectional view of the laminate of FIG. 3B after it has been stretched; and FIGS. 4A, 4B and 4C are cross-sectional views of various configurations of the laminate of the present invention.

DETAILED DESCRIPTION

A few properly treated alloys have been observed to be very resistant to localized strain instabilities that cause necking. These alloys when properly treated exhibit superplastic characteristics under the proper conditions. These superplastic alloys are capable of large uniaxial extensions, sometimes over 1000 percent because of the well-diffused necking characteristics of the alloys. Most metals do not exhibit superplastic characteristics and normally fail at elongations of less than about 35 percent at room temperature. Brittle metals exhibit an even lesser ability to tolerate elongation, often exhibiting virtually no elongation. The ability of some metals to be uniaxially extended over 100 percent is called superplasticity because it is rheologically very similar to the behavior of hot polymers in certain polymer processing techniques and it can be utilized to advantage in the shaping of metals which exhibit this capacity.

Superplastic metals are characterized by their ability to be elongated over 100 percent under the proper conditions and typically exhibit the ability to elongate from about 300 percent to about 1000 percent. These metals can generally be identified by their strain rate hardening exponent (M value) as discussed in *Deformation Processing* by Walter A. Backofen, Adison-Wesley, 1972, pp. 217–220, incorporated herein by reference.

Superplastic metals typically are characterized by a fine grain size, generally from $2 \times 10^{-5}$ to $2 \times 10^{-4}$ inches across; and usually several phases are present in the metal. Theoretical descriptions have been advanced to explain superplasticity which indicate that metals of very fine, thermomechanically stable grain structures with proper combinations of microstructure, temperature and strain rate ranges may exhibit M values in the hot polymer range. The stress relationship is expressed as:

$$\phi = K\dot{\epsilon}^M$$

where $\phi$ is stress, $\dot{\epsilon}$ is the strain rate, K is the Boltzman constant, and M is the strain rate hardening exponent. Superplastic materials are generally characterized by an M factor of above above 0.4. Non-superplastic materials generally have an M value of less than about 0.4.

The important parameter, M, is principally a function of $\dot{\epsilon}$, T, and grain size, L, with L conveniently taken to be the metallographic mean free path. It has been found that M values large enough for superplasticity are found in a more or less limited strain rate ($\dot{\epsilon}$) range. An increase in grain size will lower the range of strain rates acceptable. Decreasing temperature also reduces the strain rate at which superplasticity will be observed. Generally, superplastic materials exhibit superplasticity at a temperature in the range of from about 0.5 to about 0.8 of the absolute melting temperature of the material at an acceptable commercially used strain rate.

While the mechanism which permits materials to exhibit superplasticity is not completely understood, one theory is that a noncrystallographic deformation mechanism can be used as an excellent basis for rationalizing strongly amorphous or viscous traits in crystalline solids. This theory permits straining by the diffusional flow of single atoms (or ions) instead of by crystallographic shear from dislocation motion. In essence, the theory is that atoms diffuse through the crystal lattice using the available thermal energy of vibration. In an important variation of the model, the path is located in the crystal boundaries. On either route, an atom progresses by jumping into vacant neighboring sites which are available in increasing number as the temperature is raised. At a given temperature, more of these vacancies are produced where the lattice is most widely distended which corresponds to regions of tensile stress application. As the excess vacancies move out of the region of tension, atoms diffuse in and in so doing, cause the crystal to grow longer and thinner. Thus, the shape change of the whole aggregate of crystals goes on without special regard for the crystalline structure and the result is a viscous deformation behavior resembling that of hot glass. In a rough way, the polycrystalline viscosity can be estimated using the following formula as set forth in *Deformation Processing*:

$$\eta \simeq \frac{L^a KT}{CvD}$$

where $\eta$ is the viscosity coefficient, L is grain size, a is a constant, K the Boltzman constant, T the absolute temperature, C a geometrical constant, $v$ the atom volume, and D the diffusion coefficient.

When the flow is entirely diffused, $\phi = \eta\epsilon$ with $\eta$ being the viscosity coefficient from the above approximation. Because diffusion is slow, whatever the path, and stress is proportional to strain rate, stress could become very large in satisfying a specific strain rate. The countermove, which helps to maintain low stress and avoid neck-producing dislocation motion, is to keep the diffusion path short with the grain size small. In this way, atom transport-time is shortened and strain rate is raised for a given stress, or the viscosity is lowered.

The obvious shortcoming of the diffusional-flow rationale of superplasticity is that the measured M value is high, but still less than 1 and theory would predict M equal to 1. Nevertheless, theory does provide assistance in understanding and predicting the superplasticity phenomenon.

FIG. 1 is a perspective cross-sectional view which illustrates a high strength metal 10 containing necking sites 12 where localized inhomogeneous strains (necking) occurs under tri-axial stresses. This high strength non-superplastic metal could be, for example, AISI (American Iron and Steel Institute Standard Steels) 4340 steel or titanium. When the non-superplastic metal 10 is stretched under tensile load, the metal elongates and it does not deform uniformly, but necks in local areas of the microstructure until failure as illustrated in FIG. 1B.

The less strain rate sensitive these high strength materials are, the greater the tendency for necking is upon application of a tensile load. Thus, the cross-sectional area of the metal may be substantially decreased during forming, for example, as illustrated in FIG. 1C. FIG. 1C shows a high strength relatively implastic metal 14 which has been formed at a 10 degree angle and illustrates a significant loss of cross-sectional area at the location of the bend 16. The bend 16 is the site of the weakest area in the configuration formed. In order to achieve the desired gauge at the bend, it is necessary to use a sheet of metal of heavier gauge than otherwise required in order to maintain the proper gauge at the areas subject to forming. This is uneconomical because more metal must be used in the areas of the configuration not subjected to forming and has the disadvantage of increasing the weight of the structure formed without increasing its overall strength. Such increased weight is highly undesirable in aeronautical applications. The less ductile or malleable, less plastic, a metal is the more difficult it becomes to form. Thus, many complex configurations fabricated from high strength materials require expensive fabrication techniques.

FIG. 2A illustrates a perspective cross-sectional view of superplastic metal 18 which does not contain any significant areas where necking may occur. Upon application of a tensile load, the superplastic metal elongates rather uniformly as shown in FIG. 2B without necking. Thus, a superplastic metal 20 may be formed without appreciable decrease in the cross-sectional area at the location 22 where the metal is formed, as illustrated in FIG. 2C which shows the superplastic alloy 20 formed in a 70 degree angle. Thus, a superplastic material may be used which has a slightly larger gauge than the gauge necessary at the location of the bend. This saves metal and importantly saves weight in the item in its final configuration. Furthermore, many non-superplastic materials could not be formed to this extent without failure. Examples of alloys which may be prepared properly to exhibit superplasticity are titanium -6 aluminum-4 vanadium (hereinafter referred to as titanium 6-4) and AISI E52100 steel.

FIG. 3A illustrates a perspective cross-sectional view of the preferred embodiment of the invention where a laminate 24 is comprised of a layer 28 of non-superplastic high strength material sandwiched between layers 26 of superplastic material. The layers are bonded together such that metallurgical bonding is formed at the interface of the metals. FIG. 3B illustrates the laminate 24 before it has been stretched, the interface between the non-superplastic layers 28 and superplastic layers 26 being substantially planar. Upon stretching, laminate 24 elongates and localized necking of non-superplastic layer 28 is constrained by the superplastic layers 26, as illustrated in FIG. 3C.

The superplastic metal has preferably been processed earlier in such a way to assure it will exhibit superplastic characteristics. Those skilled in the art will appreciate that a metal capable of having superplastic characteristics will not possess that characteristic unless it has the proper microstructure. A suitable method for processing steel to achieve superplasticity is disclosed in U.S. Pat. No. 3,751,697 to O. D. Sherby et al. incorporated herein by reference.

Any bonding method which effects metallurgical bonding, i.e., atom to atom bonding between the layers, is appropriate. For example, diffusion bonding is suitable. Diffusion bonding occurs when the materials with properly treated surfaces are placed together and are heated to temperatures substantially less than their melting points, allowing the atoms to move across the interface between the metals under the influence of the energy supplied by the heat, thus bonding the metals together. Another method of bonding suitable for producing the laminate of the present invention is roll bonding, in which two or more sheets of metal are pressed together such that their cross-sectional area is reduced about 30 percent. Roll bonding, in essence, disrupts the continuity of the oxides and other impurities on the surfaces and thus allows metal to metal bonds to be formed.

In the preferred embodiment, the superplastic material and the non-superplastic material to be bonded together are characterized by similar strengths in the temperature range where the superplastic material exhibits superplastic characteristics and by absolute melting points which are close to each other. Preferably the melting points of the materials should be within about 9 to about 15 percent of one another. The strength of the nonsuperplastic material can be determined by heating it to temperatures within the range where the superplastic material exhibits superplastic characteristics and determining its strength by methods known in the art. Thus, the laminate will preferably be of similar metals and metal alloys, such as steel with steel and titanium with titanium. However, different types of metals or metal alloys which have close melting points and similar strengths in the temperature range where the superplastic material exhibits superplastic characteristics could be used.

Once the material is laminated, it is then formed using superplastic forming techniques such as described in U.S. Pat. No. 3,340,101 to Fields, Jr. incorporated herein by reference. The temperature suitable for this forming is generally from about 0.4 to about 0.8 of the absolute melting temperature of the non-superplastic material. These limits are imposed because (1) the recrystallization temperature of the non-superplastic material (which is approximately 0.4 of its absolute melting temperature) should be exceeded to control dislocation related strain hardening, and (2) above the upper limit, solid state diffusion is so rapid that compositional integrity would be destroyed in times shorter than the anticipated forming heating times including heating times for both pre- and post-heating of the laminate. The temperature selected is dependent upon the strain rate at which forming is to be conducted and because the relationship is not clearly predictable by mathematical models, empirical procedures must be conducted to determine the proper temperature and strain rate for forming the particular configuration desired.

The theory of the present invention is that the stress pattern in the superplastic layer acts upon the non-superplastic material modifying its internal stress pattern. This interaction results in the constraining of localized stresses in the non-superplastic material which normally create excessive necking, thereby limiting the necking which would otherwise occur if the non-superplastic material were not laminated to a superplastic material. This interaction thereby induces superplastic or improved plastic characteristics in the nominally non-superplastic material. All metals when heated will become more ductile and therefore exhibit greater elongation at elevated temperatures. Thus, a heated non-superplastic material will exhibit greater elongation at elevated temperatures than at room temperature. However, the laminate should have an elongation greater than 2 times the elongation of the non-superplastic material at the same temperature. As used herein, the term "improved plastic characteristics" when used in reference to the laminates, will indicate that the laminates have an elongation at least twice that of the non-superplastic material used in the laminate when heated from about 0.4 to about 0.8 of the absolute melting temperature of the non-superplastic material. Thus, the laminate of the present invention will exhibit either improved plastic characteristics or exhibit superplastic characteristics at a superplastic forming temperature and strain rate.

The preferred temperature and strain rate are determined by experimental procedures. This is necessary because of the various parameters that may be varied including cross sectional areas of the laminates, desired structure to be made, method of forming, and strain rate to be used. Superplastic forming is strain rate sensitive and must be accomplished within a critical time. The critical time is that time after which appreciable grain growth occurs in the superplastic metal thus creating areas susceptible to localized necking and thereby destroying the superplastic characteristics, or is that time period after which the interdiffusion of atoms between the non-superplastic material and superplastic material has become so great as to disrupt the superplastic characteristics of the superplastic metal.

Once formed, the laminate may then be subjected to post-heating treatments to achieve a number of desired characteristics in the final product. Post-heating may be utilized to modify the grain structure of the superplastic material such that its superplastic characteristic will be destroyed. In such cases, post-heating treatment would be employed to minimize deformation of the structure formed from the laminate when it is to be subjected to elevated temperatures during use.

One skilled in the art will appreciate that the respective cross-sectional areas of the materials bonded together is an important factor. In general, the greater the cross-sectional area of the superplastic material is in relation to the non-superplastic material, the greater will be the induced plastic characteristics, and, conversely, the greater the cross-sectional area of the non-superplastic material in relation to the cross-sectional area of the superplastic material, the less. Thus, the dimensions or cross-sectional areas of the material selected will be determined by several factors, the most important of which are: (1) the strength desired in the product, (2) the plasticity desired, and (3) combinations of strength and weight desired.

FIGS. 4A, 4B and 4C show alternate configurations of the present invention. FIG. 4A shows a two sheet laminate 30 of one layer of superplastic material 34 and one layer of non-superplastic material 32. Such a two layer laminate 32 would be suitable for small gauge, light weight products. FIG. 4B shows a laminate 36 comprised of an inner layer of superplastic material 40 sandwiched between two outer layers 38 of non-superplastic material. This laminate would be useful where the desired characteristics of the outer surface corresond to the characteristics of the non-superplastic material, for example, to achieve a corrosion resistant outer surface by utilizing stainless steel. FIG. 4C shows a multilayered laminate 42 of alternating layers of superplastic material 44 and non-superplastic material 46. Such a multilayered laminate may be desirable in the fabrication of larger heavy gauge materials. The illustrated embodiments are not exhaustive of various other modifications and configurations which will be within the scope of the invention.

EXAMPLES

The present invention may be better understood by reference to the following examples which are not intended to limit the scope of invention.

Laminates were made of a layer of AISI 4340 steel sandwiched between and bonded to layers of AISI E52100 steel. Elongations of 100 percent and more were obtained for specimens with gauge lengths of three inches and elongations of several hundred percent were obtained for specimens with gauge lengths of 0.3 inches. These elongations are considerably higher than that for AISI 4340 steel alone which is about 12 percent.

These results indicate that other materials systems could also be utilized to create laminates with induced superplasticity. Appropriate material systems would include:

| Laminate | Non-Superplastic Component | Superplastic Component |
|---|---|---|
| Steel A | Type 321 Stainless* | 52100 Bearing Steel* |
| Steel B | Maraging Steel | 52100 Bearing Steel* |
| Steel C | 4340 Steel* | 52100 Bearing Steel* |
| Steel D | Low Alloy Steel | Advanced Ultra High Carbon Steel |
| Titanium A | Ti—10V—2Fe—3Al** | Ti—6-Al—4V** |
| Titanium B | Ti—15V—3Cr—3Al—3Sn** | Ti—6-Al—4V** |

| Laminate | Non-Superplastic Component | Superplastic Component |
|---|---|---|
| Aluminum A | 6061*** | 7475*** |

*All references to AISI (American Iron and Steel Institute) numbers.
**Designation is titanium alloy content as used in the Alloy Digest.
***Refers to the Aluminum Association Alloy type number commonly used as a standard in the United States.

Other superalloys are identified by P. Chaudhari in "Superplasticity" on page 49 of *Science and Technology*, September, 1968, hereby incorporated by reference.

While the preferred embodiment of the present invention has been described in detail herein and shown in the accompanying drawings, it will be evident that various further modifications are possible without departing from the scope of the invention.

What is claimed is:

1. A metal laminate comprising a layer of a superplastic metal metallurgically bonded to a layer of a non-superplastic metal.

2. A metal laminate comprising:
   (a) a first layer of a superplastic metal;
   (b) a second layer of a non-superplastic metal metallurgically bonded to one side of said first layer; and
   (c) a third layer of a superplastic material metallurgically bonded to the side of said second layer opposite the side to which the said first layer is bonded.

3. A metal laminate comprising:
   (a) a first layer of a non-superplastic metal;
   (b) a second layer of a superplastic metal metallurgically bonded to one side of said first layer; and
   (c) a third layer of non-superplastic metal metallurgically bonded to the side of said second layer opposite the side of said second layer which is bonded to said first layer.

4. A metal laminate comprising alternating layers of at least a first layer of a superplastic metal and a second layer of non-superplastic materials which layers are metallurgically bonded together.

5. The laminate of claim 1, 2, 3 or 4 wherein said layers are metallurgically bonded together by roll bonding or diffusion bonding.

6. The laminate of claim 1, 2, 3 or 4 wherein said superplastic material is AISI 52100 bearing steel.

7. The laminate of claim 5 wherein said superplastic material is AISI 52100 bearing steel.

8. The laminate of claim 6 wherein said non-superplastic material is type 321 stainless steel, maraging steel, 4340 steel, or a combination thereof.

9. The laminate of claim 5 wherein said non-superplastic material is type 321 stainless steel, maraging steel, 4340 steel, or a combination thereof.

10. The laminate of claim 1, 2, 3 or 4 wherein said superplastic material is advanced ultra high carbon steel and wherein said non-superplastic material is low alloy steel.

11. The laminate of claim 5 wherein said superplastic material is advanced ultra high carbon steel and wherein said non-superplastic material is low alloy steel.

12. The laminate of claim 1, 2, 3 or 4 wherein said superplastic material is titanium-6 aluminum-4 vanadium alloy.

13. The laminate of claim 12 wherein said non-superplastic material is titanium-10 vanadium-2 iron-3 aluminum alloy or titanium-15 vanadium-3 chromium-3 aluminum-3 tin alloy.

14. The laminate of claim 5 wherein said superplastic material is titanium-6 aluminum-4 vanadium alloy.

15. The laminate of claim 5 wherein said non-superplastic material is titanium-10 vanadium-2 iron-3 aluminum alloy or titanium-15 vanadium-3 chromium-3 aluminum-3 tin alloy.

16. The laminate of claim 1, 2, 3 or 4 wherein said non-superplastic material is titanium-10 vanadium-2 iron-3 aluminum alloy or titanium-15 vanadium-3 chromium-3 aluminum-3 tin alloy.

17. The laminate of claim 1, 2, 3 or 4 wherein said superplastic material is Aluminum Association No. 7475 aluminum alloy and wherein said non-superplastic material is Aluminum Association 6061 aluminum alloy.

18. The laminate of claim 5 wherein said super plastic material is Aluminum Association No. 7475 aluminum alloy.

19. The laminate of claim 5 wherein said non-superplastic material is Aluminum Association 6061 aluminum alloy.

20. The laminate of claim 1, 2, 3 or 4 wherein said superplastic material is Aluminum Association No. 7475 aluminum alloy.

21. The laminate of claim 1, 2, 3 or 4 wherein said superplastic material is Aluminum Association No. 6061 aluminum alloy.

22. The process of forming metal laminates comprising:
   (a) heating a metal laminate comprised of layers of superplastic material bonded to layers of non-superplastic material to a temperature from about 40 percent to about 80 percent of the absolute melting temperature of the non-superplastic material in the laminate; and
   (b) forming said laminate.

23. The process of claim 22 wherein said superplastic material is selected from the group consisting of AISI 52100 bearing steel, advanced ultra high carbon steel, titanium-6 aluminum-4 vanadium, and Aluminum Association 7475 aluminum alloy.

24. The process of claim 22 wherein said non-superplastic material is selected from the group consisting of AISI type 321 stainless steel, AISI 4340 steel maraging steel, low alloy steel, titanium-10 vanadium-2 iron-3 aluminum alloy, titanium-15 vanadium-3 chromium-3 aluminum-3 tin alloy, or Aluminum Association 6061 aluminum alloy.

* * * * *